United States Patent
Lu

(10) Patent No.: US 9,570,895 B2
(45) Date of Patent: Feb. 14, 2017

(54) CABLE DRAG CHAIN AND CABLE DRAG CHAIN ASSEMBLY

(71) Applicant: HON HAI PRECISION INDUSTRY CO., LTD., New Taipei (TW)

(72) Inventor: Hung-Chun Lu, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 12 days.

(21) Appl. No.: 14/804,701

(22) Filed: Jul. 21, 2015

(65) Prior Publication Data

US 2016/0149384 A1    May 26, 2016

(30) Foreign Application Priority Data

Nov. 21, 2014 (CN) .......................... 2014 1 0671643

(51) Int. Cl.
*H02G 3/04* (2006.01)
*F16L 3/015* (2006.01)
*F16G 13/16* (2006.01)

(52) U.S. Cl.
CPC ............ *H02G 3/0475* (2013.01); *F16G 13/16* (2013.01); *F16L 3/015* (2013.01)

(58) Field of Classification Search
CPC ......... F16G 13/16; F16L 3/015; H02G 3/0475

USPC ........................................................ 59/78.1
See application file for complete search history.

(56) References Cited

U.S. PATENT DOCUMENTS

| 7,513,097 B2* | 4/2009 | Utaki ...................... F16G 13/16 248/49 |
| 7,637,092 B2* | 12/2009 | Utaki ...................... F16G 13/16 248/49 |
| 2015/0211658 A1* | 7/2015 | Lu ........................... F16L 3/015 59/78.1 |
| 2016/0149384 A1* | 5/2016 | Lu ......................... H02G 3/0475 59/78.1 |

* cited by examiner

*Primary Examiner* — David B Jones
(74) *Attorney, Agent, or Firm* — Zhigang Ma

(57) ABSTRACT

A cable drag chain includes a number of first coupling members, a number of second coupling members engaging with the first coupling members, a number of latching members each including at least one mounting portion, a first fixing member and a second fixing member engaged with opposite ends of the first and second coupling members, and a sliding member slidably coupled to the first fixing member and including a latching portion. When the sliding member slides from the first fixing member to the second fixing member, the latching portion urges against the at least one mounting portion of each latching member to engage each latching member with corresponding first and second coupling members for holding a cable.

19 Claims, 11 Drawing Sheets

CABLE DRAG CHAIN AND CABLE DRAG CHAIN ASSEMBLY

FIELD

The subject matter herein generally relates to a cable drag chain and a cable drag chain assembly.

BACKGROUND

Electronic devices, such as servers or computers, are commonly assembled by a mechanical arm. The electronic device can include an enclosure and a plurality of electronic modules received in the enclosure. The plurality of electronic modules can include a power supply module, a motherboard, a fan, a storage device, and such. Each electronic module can be connected to another electronic module via electric cables, therefore, cable drag chains are widely used to support and guide the electric cables.

BRIEF DESCRIPTION OF THE DRAWINGS

Implementations of the present technology will now be described, by way of example only, with reference to the attached figures.

DETAILED DESCRIPTION

Figure 1:
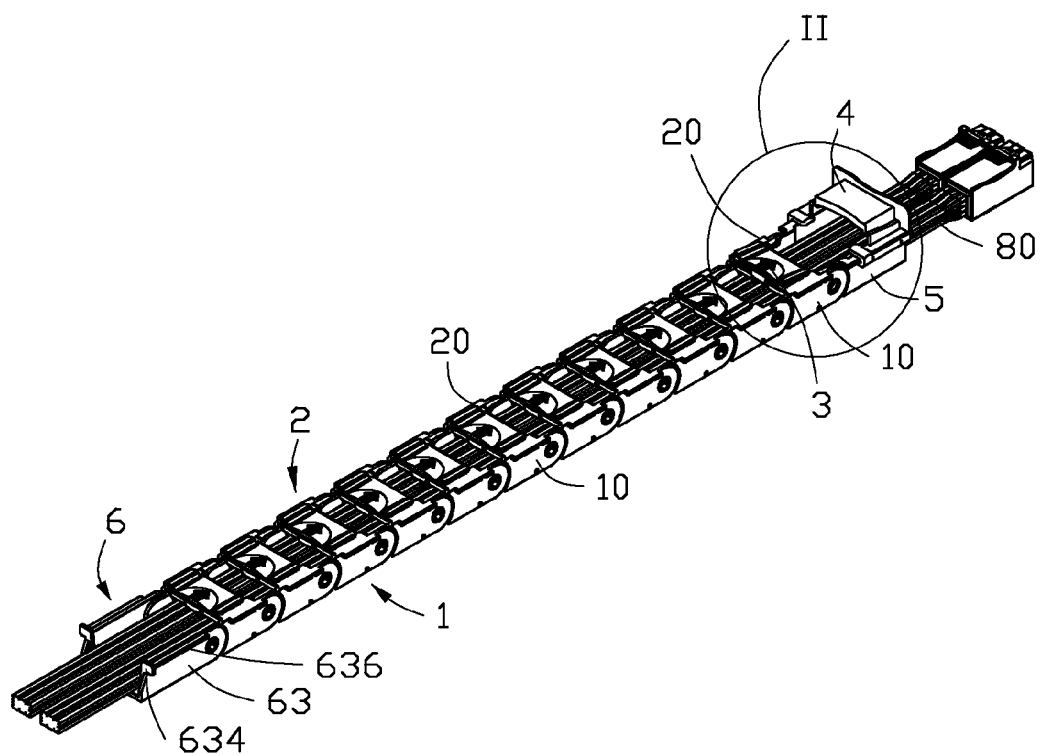
FIG. 1 is an assembled, isometric view of an embodiment of a cable drag chain assembly, wherein the cable drag chain assembly comprises a cable drag chain and a cable.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as coupled, whether directly or indirectly through intervening components, and is not necessarily limited to physical connections. The connection can be such that the objects are permanently coupled or releasably coupled. The term "substantially" is defined to be essentially conforming to the particular dimension, shape or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to a cable drag chain assembly.

Figure 2:
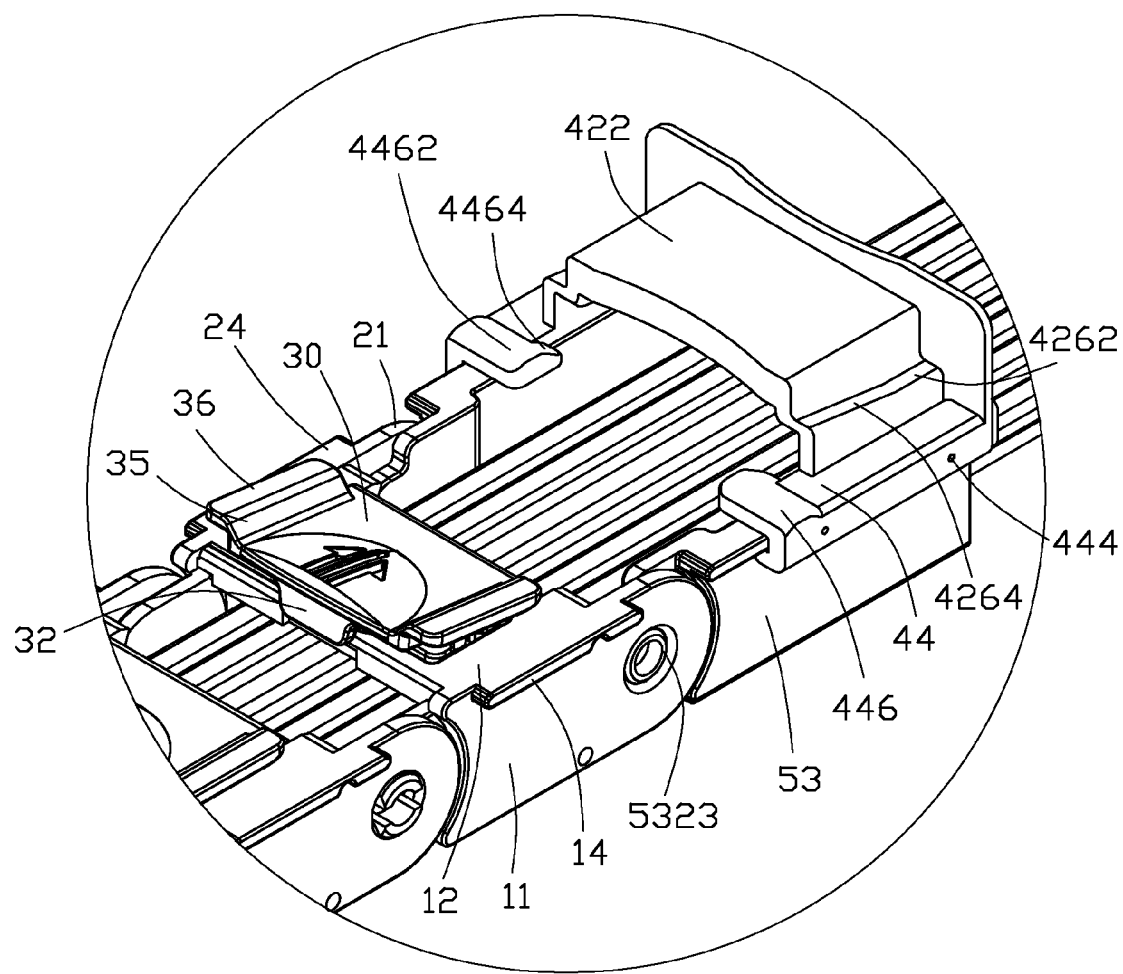
FIG. 2 is an enlarged view of a circled portion II of FIG. 1.

FIGS. 1 and 2 illustrate that an embodiment of a cable drag chain assembly comprises a first chain 1, a second chain 2, a plurality of latching members 3, a sliding member 4, a first fixing member 5, a second fixing member 6, and a cable 80. The first chain 1 comprises a plurality of first coupling members 10. The second chain 2 comprises a plurality of second coupling members 20. The number of the plurality of first coupling members 10 and the number of the plurality of second coupling members 20 are equal to each other.

Figure 3:
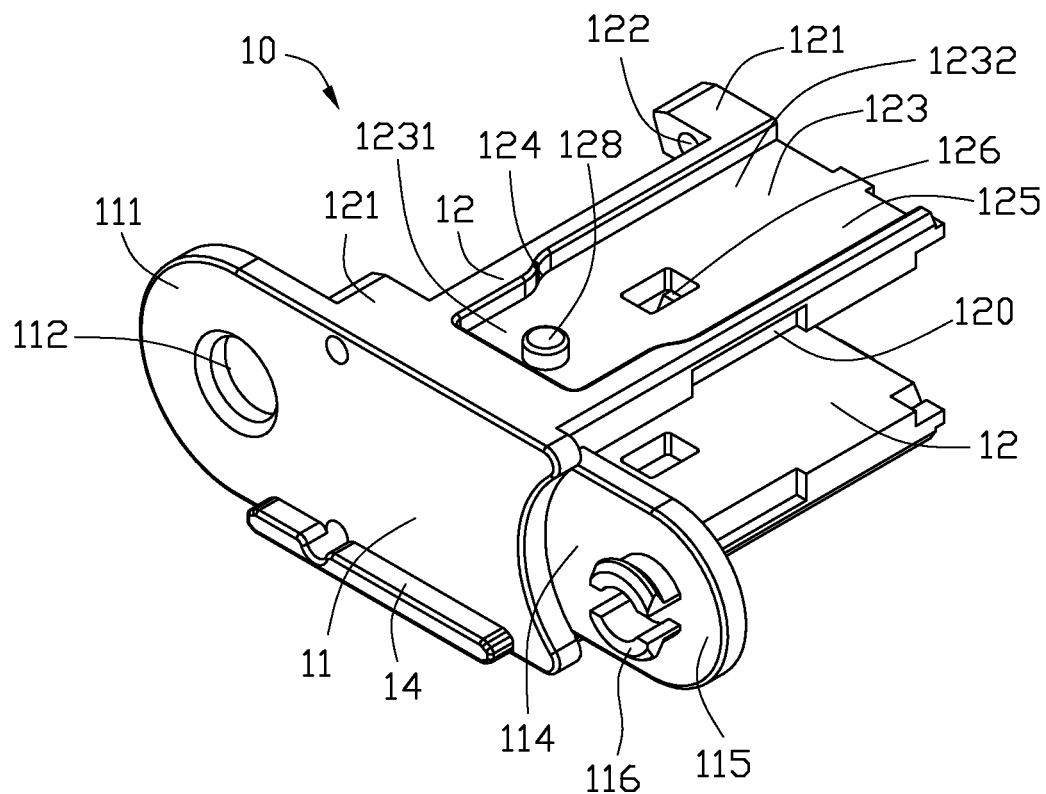
FIG. 3 is an isometric view of a first coupling member of a first chain of FIG. 1.

FIG. 3 illustrates that each first coupling member 10 comprises a base plate 11 having an inner side face and an outer side face opposite and parallel to the inner side face, two parallel mounting plates 12 extending perpendicularly from a top end and a bottom end of the inner side face of the base plate 11, and a rail 14 extending from a bottom end of the outer side face of the base plate 11. An arced extension plate 111 extends from a front end of the base plate 11 and an arced extension tab 115 extends from a rear end of the inner side face of the base plate 11. A through hole 112 is defined in the extension plate 111. A receiving space 114 is defined between the base plate 11 and the extension tab 115. A pair of elastic hooks 116 extends, opposite to each other, from an outer side face of the extension tab 115. Each mounting plate 12 comprises a front side face and a rear side face opposite to and parallel to the front side face. A pair of blocks 121 extends from opposite ends of the front side face of the mounting plate 12. Each block 121 defines a through hole 122 in a direction perpendicular to the base plate 11. A notch 120 is defined in the rear side face of the mounting plate 12. An elongate recessed portion 123 is defined in a top surface of the mounting plate 12. The recessed portion 123 comprises a first portion 1232 near the base plate 11 and a second portion 1231 away from the base plate 11. The first portion 1232 is wider than the second portion 1231. A coupling portion 124 is slantingly coupled between the first portion 1231 and the second portion 1232 of the recessed portion 123. An engaging hole 126 is defined in a bottom wall 125 of the receiving groove 123, and a post 128 extends from the bottom wall 125.

Figure 4:
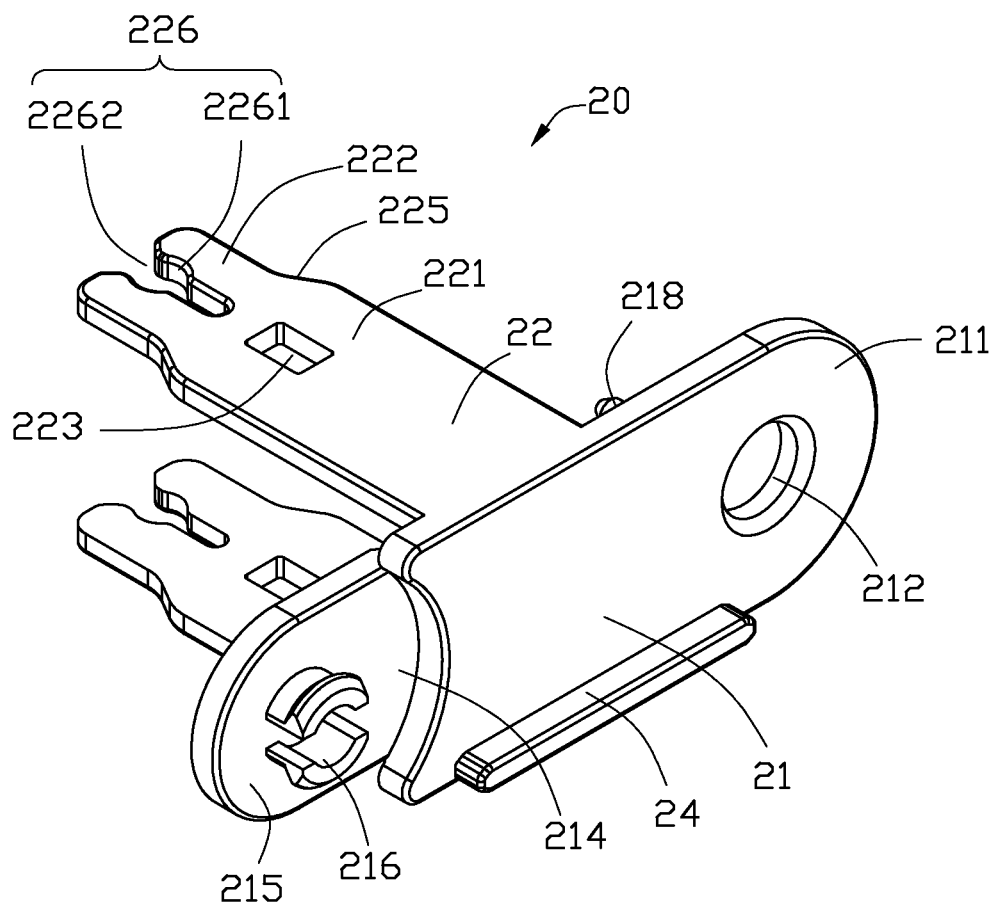
FIG. 4 is an isometric view of a second coupling member of a second chain of FIG. 1.

FIG. 4 illustrates that each second coupling member 20 comprises a base board 21 having an inner side face and an outer side face opposite and parallel to the inner side face, two parallel mounting boards 22 extending perpendicularly from a top end and a bottom end of the inner side face of the base board 21, and a rail 24 extending from a bottom end of the outer side face of the base board 21. An arced extension board 211 extends from a front end of the base board 21 and an arced extension tab 215 extends from a rear end of the inner side face of the base board 21. A through hole 212 is defined in the extension board 211. A receiving space 214 is defined between the extension tab 215 and the base board 21. A pair of elastic hooks 216 extends, opposite to each other, from an outer side face of the extension tab 215. Two pins 218 extend from the inner side face of the base board 21 beside the two mounting plates 22, adjacent the extension board 211. Each mounting board 22 comprises a first portion 221 near the base board 21 and a second portion 222 away from the base board 21. The first portion 221 is wider than the second portion 222. A coupling portion 225 is slantingly coupled between the first portion 221 and the second portion 222. The first portion 221 defines a through hole 223. The second portion 222 defines a notch 226 comprising a round engaging slot 2261 and a guiding groove 2262 communicating with the engaging slot 2261. The guiding groove 2262 extends through an end of the second portion 222 away from the base board 21.

Figure 5:
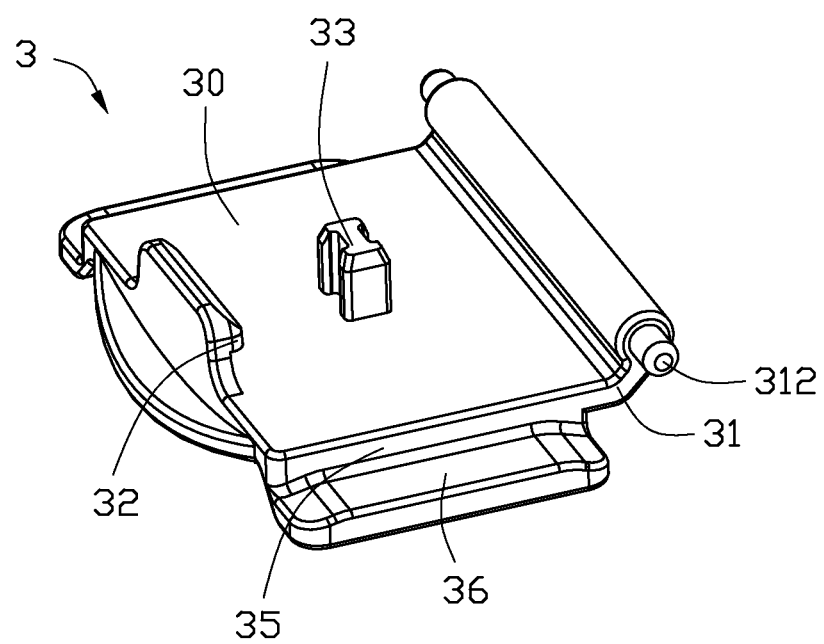
FIG. 5 is an isometric view of a latching member of FIG. 1.

FIG. 5 illustrates that each latching member 3 comprises a substantially square base 30, an extending portion 31 located at a front end of the base 30, a latch 32 located at a rear end of the base 30, a post 33 extending from the base 30, and two coupling portions 35 extending from opposite sides of the base 30 in a direction away from the post 33. The post 33 is located between the extending portion 31 and the latch 32. A shaft 312 is located at each end of the extending portion 31. A mounting portion 36 extends from a side of each coupling portion 35 away from the base 30. The mounting portion 36 comprises a top surface parallel to the base 30 and a bottom surface parallel to and opposite to the top surface.

Figure 6:
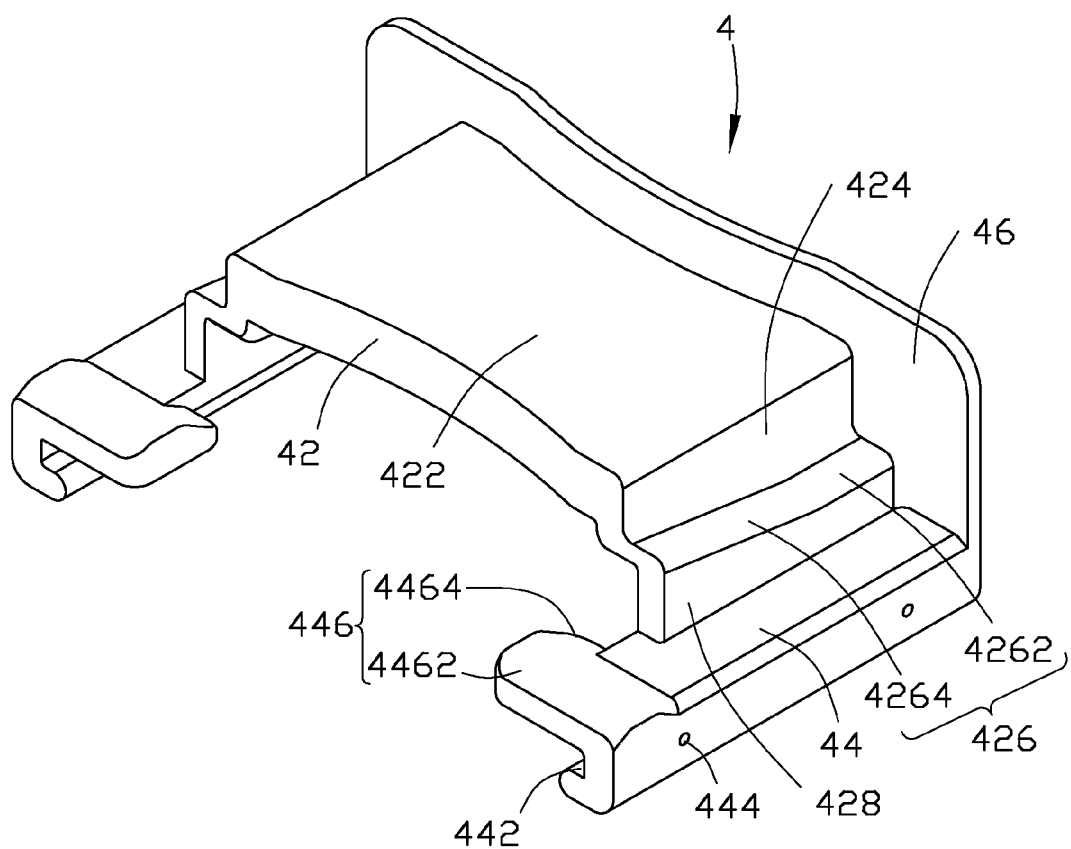
FIG. 6 is an isometric view of a sliding member of FIG. 1.

FIG. 6 illustrates that the sliding member 4 comprises a latching portion 42, two sliding bars 44 extending from opposite sides of the latching portion 42, and an operation portion 46 extending from a front end of the latching portion 42 and coupled to the two sliding bars 44. The latching portion 42 comprises a top wall 422, two extending walls 424 extending down from opposite sides of the top wall 422, two urging walls 426 extending outward from two bottom sides of the two extending walls 424, and two coupling walls 428 extending down from two sides of the two urging walls 426 away from the top wall 422 and coupled to the two sliding bars 44. Each urging wall 426 comprises an urging portion 4262 in the front of the urging wall 426 and a guiding portion 4264 extending on a slant up from a rear end of the urging portion 4262. Each sliding bar 44 comprises an inner side face facing the other sliding bar 44 and an outer side facing opposite and parallel to the inner side face. A long sliding slot 442 is defined in the inner side face of the sliding bar 44. Two engaging holes 444, communicating with the sliding slot 442, are defined in the outer side face of the sliding bar 44. A releasing plate 446 extends from a rear end of the inner side face of the sliding bar 44 at the top, above the sliding slot 442 of the sliding bar 44. The releasing plate 446 comprises an urging face 4462 and a guiding face 4464 extending slantingly and down from a front end of the urging face 4462.

Figure 7:
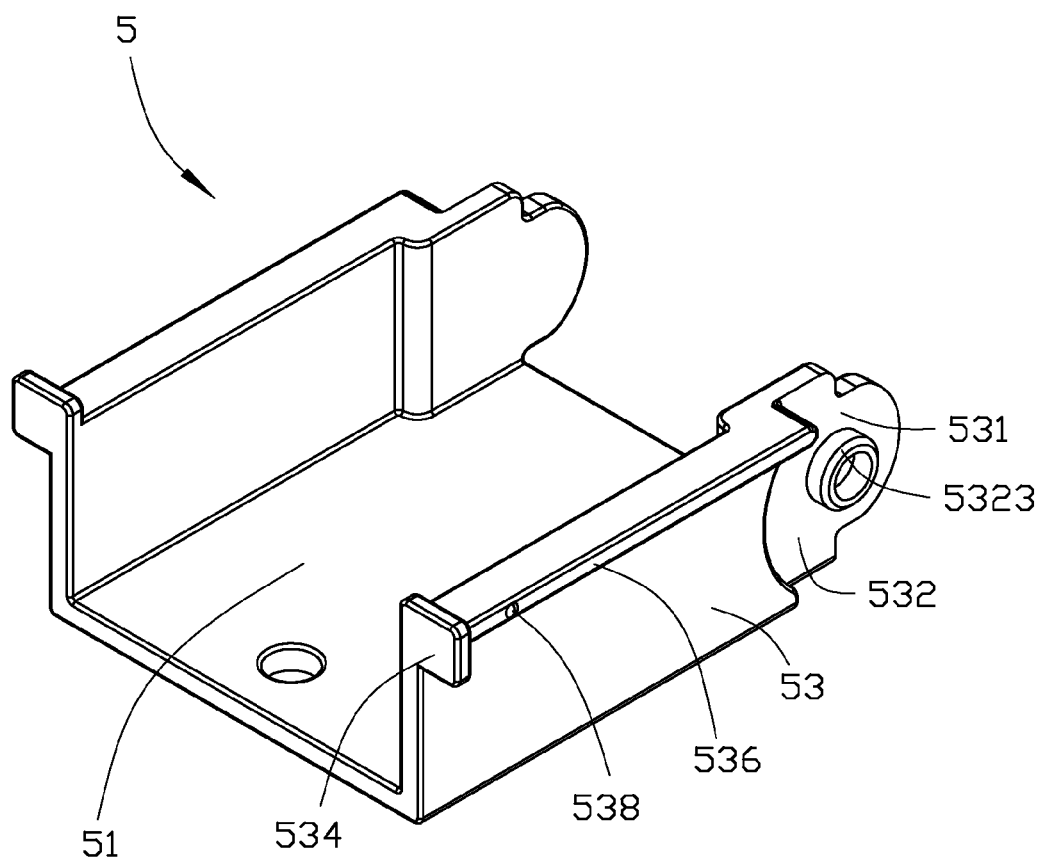
FIG. 7 is an isometric view of a first fixing member of FIG. 1.

FIG. 7 illustrates that the first fixing member 5 comprises a base plate 51 and two side plates 53 extending up from opposite sides of the base plate 51. Each side plate 53 comprises an inner side face facing the other side plate 53 and an outer side facing opposite to the inner side face. An arced extension tab 531 extends from a front end of the inner side face of the side plate 53 and a blocking plate 534 extends outward from a rear end of the side plate 53 at the top. A receiving space 532 is defined between the side plate 53 and the base plate 51. A post 5323 extends outward from an outer side face of the extension tab 531. A rail 536 extends outward from a top end of the outer side face of the side plate 53. A protrusion 538 extends outward from a side face of the rail 536 away from the side plate 53, near the blocking plate 534.

Figure 8:
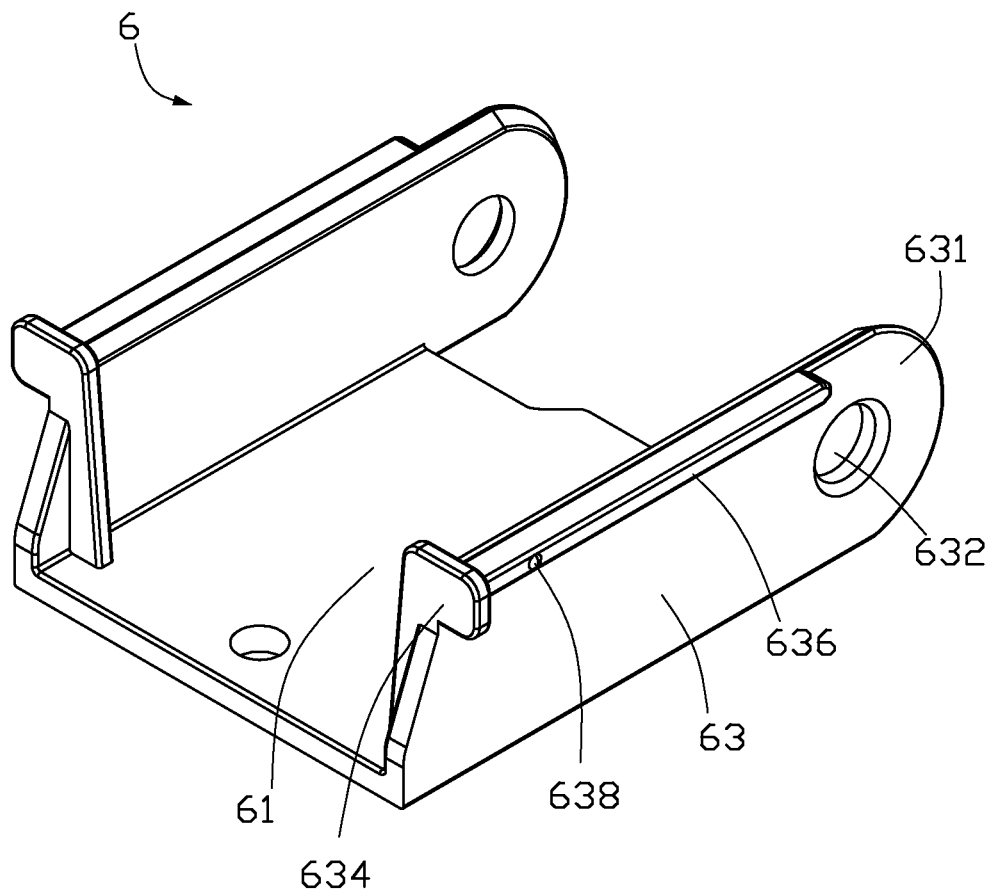
FIG. 8 is an isometric view of a second fixing member of FIG. 1.

FIG. 8 illustrates that the second fixing member 6 comprises a base board 61 and two side boards 63 extending up from opposite sides of the base board 61. Each side board 63 comprises an inner side face facing the other side board 63 and an outer side face opposite to the inner side face. An arced extension board 631 extends from a front end of the inner side face of the side board 63 and a blocking board 634 extends outward from a rear end of a second end of the side board 63 at the top. A through hole 632 is defined in the extension board 631. A rail 636 extends outward from a top end of the outer side face of the side board 63. A protrusion 638 extends from a side face of the rail 636 away from the side board 63, near the blocking board 634.

Figure 9:
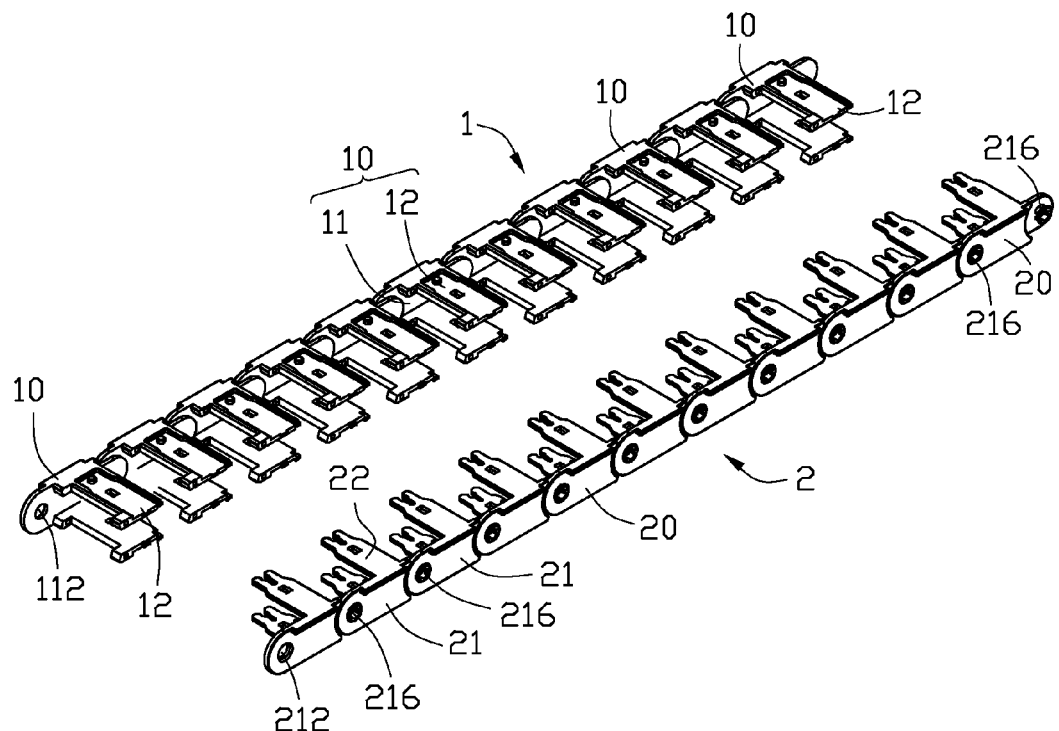
FIG. 9 is an isometric view of the first chain and the second chain of FIG. 1, wherein the first chain is separated from the second chain.
Figure 10:
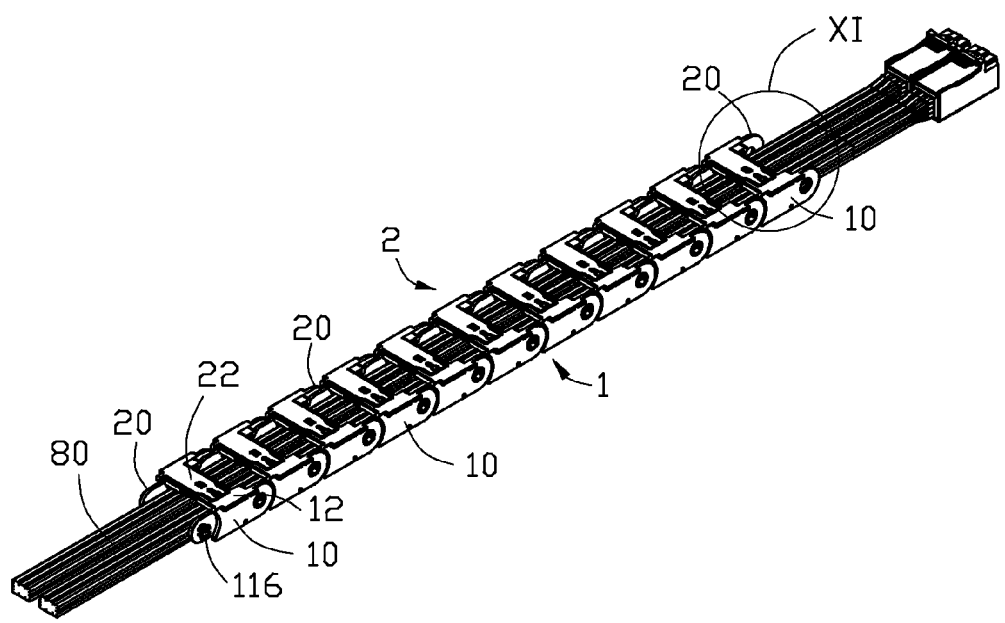
FIG. 10 is an isometric view of the first chain, the second chain, and the cable of FIG. 1, wherein the first chain is engaged with the second chain to clamp the cable.
Figure 11:
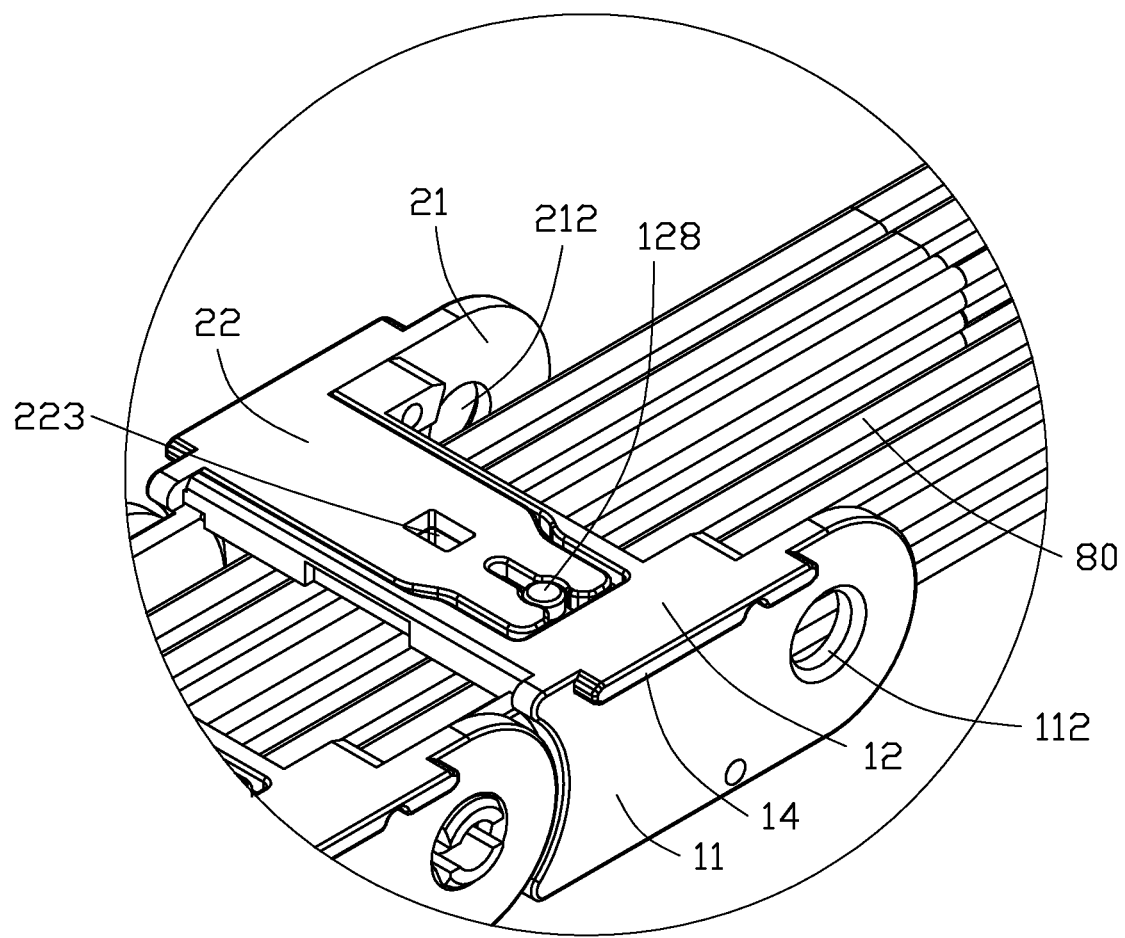
FIG. 11 is an enlarged view of a circled portion XI of FIG. 10.

FIGS. 1, 5 and 9 illustrate the first chain 1 and the plurality of latching members 3 in assembly. The base plates 11 of the plurality of first coupling members 10 are sequentially coupled one by one to make the plurality of first coupling members 10 form the first chain 1. In detail, the extension plate 111 of each first coupling member 10 is received in the receiving space 114 of the neighboring first coupling member 10. The two hooks 116 of each first coupling member 10 extend through the through hole 112 of the neighboring first coupling member 10, and are engaged with an outer side face of the extension plate 111 of the neighboring first coupling member 10. The rail 14 of each first coupling member 10 is aligned with the rail 14 of the neighboring first coupling member 10. To make the plurality of latching members 3 pivotably couple to the plurality of the first coupling members 10 on the same side, each latching member 3 is pivotably coupled to a front side of the mounting plate 12 extending from the bottom end of the base plate 11 of a corresponding first coupling member 10. The extending portion 31 of the latching member 3 is placed between the pair of pivoting blocks 121 of the mounting plate 12. The two shafts 312 of the latching member 3 are engaged in the two through holes 122 of the mounting plate 12 of the first coupling member 10.

FIG. 9 illustrates the second chain 2 in assembly. The base boards 21 of the plurality of second coupling members 20 are sequentially coupled one by one to make the plurality of second coupling members 20 form the second chain 2. The extension board 211 of each second coupling member 20 is received in the receiving space 214 of the neighboring second coupling member 20. The two hooks 216 of each second coupling member 20 extend through corresponding through holes 212 of the neighboring second coupling member 20, and are engaged with an outer side face of the extension board 211 of the neighboring second coupling member 20.

FIGS. 1 and 9-11 illustrate the first chain 1 with the plurality of latching members 3, the second chain 2 and the cable 80 in assembly. Each first coupling member 10 is aligned with and engaged with a corresponding second coupling member 20, to allow the first chain 1 to be engaged with the second chain 2 for clamping the cable 80. The two second portions 222 of the second coupling member 20 are engaged in the two second portions 1231 of the first coupling member 10, and the two first portions 221 of the second coupling member 20 are engaged in the two first portions 1232 of the first coupling member 10. The two coupling portions 225 of the second coupling member 20 are engaged with the two coupling portions 124 of the first coupling member 10. The two posts 128 of the first coupling member 10 extend through the two guiding grooves 2262 of the second coupling member 20 and are engaged in the two engaging slots 2261 of the second coupling member 20. The two through slots 126 of the first coupling member 10 are aligned with the two through slots 223 of the second coupling member 20. The two pins 218 of the second coupling member 20 are engaged in the two through holes 122 of the first coupling member 10 away from the base plate 11 from two outer sides of the two through holes 122 against the base plate 11. The cable 80 can extend through the first chain 1 and the second chain 2.

FIGS. 1-2 illustrate the first fixing member 5, the second fixing member 6, the first chain 1 engaged with the second chain 2 in assembly. The first chain 1 and the second chain 2 have a front end and a rear end opposite to the front end. To make the first fixing member 5 pivotably couple to the front end of the first chain 1 and the second chain 2, the extension plate 111 of the first coupling member 10 and the extension board 211 of the second coupling member 20 both located at the front end of the first chain 1 and the second chain 2 are received in the two receiving spaces 532 of the first fixing member 5. The two posts 5323 of the first fixing member 5 are engaged in the through hole 112 of the first coupling member 10 located at the front end of the first chain 1 and the second chain 2 and the through hole 212 of the second coupling member 20 located at the front end of the first chain 1 and the second chain 2. To allow the second fixing member 6 to pivotably couple to the rear end of the first chain 1 and the second chain 2, the pair of elastic hooks 116 of the first coupling member 10 and the pair of elastic hooks 216 of the second coupling member 20 both located at the rear end of the first chain 1 and the second chain 2 extend through the two through holes 632 of the second fixing member 6 and are engaged with two outer side faces of the two extension boards 631.

FIGS. 1 and 2 further illustrate the sliding member 4 and the first fixing member 5 in assembly. The first fixing member 5 is rotated up in relation to the first chain 1 and the second chain 2, to make the sliding member 4 slidably couple to the first fixing member 5 from two front ends of the two rails 536 of the first fixing member 5. The two rails 536 of the first fixing member 5 are slidably received in the two sliding slots 442 of the sliding member 4. The two protrusions 538 of the first fixing member 5 can be engaged in the two engaging holes 444 of the sliding member 4 near the operation portion 46 to fix the sliding member 4. The two sliding slots 442 are located between the first chain 1 engaging with the second chain 2 and the operation portion 46.

In use, the two rails 14 of each first coupling member 10, the two rails 24 of each second coupling member 20, the two rails 536 of the first fixing member 5, and the two rails 636 of the second fixing member 6 are aligned with each other for the sliding member 4 to slide along and through the two sliding slots 442. When the sliding member 4 slides over each first coupling member 10, the latching member 3 pivotably couples to the first coupling member 10. The second coupling member 20 engages with the first coupling member 10 from the first fixing member 5 to the second fixing member 6. Additionally, the two guiding portions 4264 of the sliding member 4 slidably urge against the two top surfaces of the two mounting portions 36 of the latching member 3 and rotate the latching member 3 toward the first coupling member 10. The two urging portions 4262 of the sliding member 4 urge against the two top surfaces of the two mounting portions 36 of the latching member 3, allowing the latching member 3 to be engaged with the first coupling member 10 and the second coupling member 20. In detail, the post 33 of the latching member 3 extends through the through hole 223 of the second coupling member 20 and is engaged in the engaging hole 126 of the first coupling member 10, and the latch 32 of the latching member 3 is engaged in the notch 120 of the first coupling member 10. When the sliding member 4 slides to the second fixing member 6, the two protrusions 638 of the second fixing member 6 can be engaged in the two engaging holes 444 of the sliding member 4 away from the operation portion 46 fixing the sliding member 4.

The drag chain can be dissembled when the sliding member 4 slides over each first coupling member 10, the latching member 3 pivotably coupled to the first coupling member 10, and the second coupling member 20 engaged with the first coupling member 10 from the second fixing member 6 to the first fixing member 5. The two guiding faces 4464 and the two urging faces 4462 of the sliding member 4 successively urge, allowing the latching member 3 to be disengaged from the first coupling member 10 and the second coupling member 20, against the two bottom surfaces of the two mounting portions 36 of the latching member 3. The latch 32 of the latching member 3 is disengaged from the notch 120 of the first coupling member 10, and the post 33 of the latching member 3 is disengaged from the engaging hole 126 of the first coupling member 10 and drops out of the through hole 223 of the second coupling member 20. When the sliding member 4 slides to the first fixing member 5, the first chain 1 and the second chain 2 can be detached and the cable 80 can be taken out.

The embodiments shown and described above are only examples. Many details are often found in the art such as the other features of a cable drag chain assembly. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:
1. A cable drag chain for holding a cable, the cable drag chain comprising:
 a first chain having a front end and a rear end and comprising a plurality of first coupling members each defining an engaging hole, the plurality of first coupling members sequentially coupled one by one to form the first chain;
 a second chain having a front end and a rear end and comprising a plurality of second coupling members each defining a through hole, wherein the plurality of second coupling members is sequentially coupled one by one to form the second chain and is engaged with the plurality of first coupling members for receiving the cable;
 a plurality of latching members each comprising a base pivotably coupled to a front side of a corresponding first coupling member, a post located on the base, and at least one mounting portion located on the base;

a first fixing member engaged with the front ends of the first chain and the second chain;

a second fixing member engaged with the rear ends of the first chain and the second chain; and a sliding member comprising a latching portion and slidably coupled to the first fixing member and configured to slide along the first chain, the second chain, and the second fixing member;

wherein, when the sliding member is slid over at least one first coupling member, the latching member pivotably coupled to the at least one first coupling member, and the second coupling member engaged with the at least one first coupling member from the first fixing member to the second fixing member, the latching portion of the sliding member urges against the at least one mounting portion of the latching member to make the post of the latching member extend through the through hole of the second coupling member and be engaged in the engaging hole of the at least one first coupling member for holding the cable.

2. The cable drag chain of claim 1, wherein the sliding member further comprises two sliding bars located on the latching portion, two rails are located on each of the first fixing member, the second fixing member, the plurality of first coupling members, and the plurality of the second coupling members, and the two sliding bars are configured to slide along the rails.

3. The cable drag chain of claim 2, wherein each sliding bar comprises an inner side face facing to the other sliding bar and an outer side face opposite to the inner side face, two sliding slots for the rails sliding along are defined in the two inner side faces, two engaging holes are defined in the outer side face of the sliding bar, a protrusion configured to be engaged in a corresponding engaging hole of the sliding member is located on each of the two rails of the first fixing member and the two rails of the second fixing member.

4. The cable drag chain of claim 2, wherein the latching portion comprises a top wall, two extending walls located at opposite sides of the top wall, two urging walls located at two bottom sides of the two extending walls, and two coupling walls located at two sides of the two urging walls away from the top wall and coupled to the two sliding bars, and each latching member comprises the two mounting portions located at two sides of the base and configure to be urged against by the two urging walls.

5. The cable drag chain of claim 4, wherein each urging wall comprises an urging portion and a guiding portion which urge against two corresponding mounting portions successively.

6. The cable drag chain of claim 2, wherein a releasing plate extends from each sliding bar, and when the sliding member slides from the second fixing member to the first fixing member, the two releasing plates of the two sliding bars urge up against two corresponding mounting portions.

7. The cable drag chain of claim 6, wherein each releasing plate comprises an urging face at the top and a guiding face extending slantingly and down from a front end of the urging face, and when the sliding member slides from the second fixing member to the first fixing member, the two guiding faces and the two urging faces urge up against the two corresponding mounting portions successively.

8. The cable drag chain of claim 2, wherein each latching member further comprises a latch located on the base, a notch is defined in a rear side face of the mounting plate, the latching member is rotated to engage the latch in the notch.

9. The cable drag chain of claim 1, wherein each first coupling member comprises a base plate and two mounting plates located on the base plate, each second coupling member comprises a base board and two mounting boards located on the base board, the two mounting boards are engaged with the two mounting plates, and each base is pivotably coupled to a front side of a corresponding mounting plate, and the engaging hole is defined in the corresponding mounting plate, the through hole is defined in each mounting board engaged with the corresponding mounting plate.

10. A cable drag chain assembly comprising:

a cable;

a first chain having a front end and a rear end and comprising a plurality of first coupling members each defining an engaging hole sequentially coupled one by one to form the first chain;

a second chain having a front end and a rear end and comprising a plurality of second coupling members each defining a through hole, wherein the plurality of second coupling members is sequentially coupled one by one to form the second chain and is engaged with the plurality of first coupling members to receive the cable;

a plurality of latching members each comprising a base pivotably coupled to a front side of a corresponding first coupling member, a post extending from the base, and at least one mounting portion located on the base;

a first fixing member engaged with the front ends of the first chain and the second chain;

a second fixing member engaged with the rear ends of the first chain and the second chain; and a sliding member slidably coupled to the first fixing member and configured to slide along the first chain, the second chain, and the second fixing member, the sliding member comprising a latching portion;

wherein, when the sliding member slides over at least one first coupling member, the latching member pivotably coupled to the at least one first coupling member, and the second coupling member engaged with the at least one first coupling member from the first fixing member to the second fixing member, the latching portion of the sliding member urges against the at least one mounting portion of the latching member, to make the post of the latching member extend through the through hole of the second coupling member and be engaged in the engaging hole of the at least one first coupling member for holding the cable.

11. The cable drag chain assembly of claim 10, wherein the sliding member further comprises two sliding bars located on the latching portion, two rails are located on each of the first fixing member, the second fixing member, the plurality of first coupling members, and the plurality of the second coupling members, and the two sliding bars are configured to slide along the rails.

12. The cable drag chain assembly of claim 11, wherein each sliding bar comprises an inner side face facing to the other sliding bar and an outer side face opposite to the inner side face, two sliding slots for the rails sliding along are defined in the two inner side faces, two engaging holes are defined in the outer side face of the sliding bar, a protrusion configured to be engaged in a corresponding engaging hole of the sliding member is located on each of the two rails of the first fixing member and the two rails of the second fixing member.

13. The cable drag chain assembly of claim 11, wherein the latching portion comprises a top wall, two extending walls located at opposite sides of the top wall, two urging walls located at two bottom sides of the two extending walls, and two coupling walls located at two sides of the two urging walls away from the top wall and coupled to the two sliding bars, and each latching member comprises the two mounting portions located at two sides of the base and configure to be urged against by the two urging walls.

14. The cable drag chain assembly of claim 13, wherein each urging wall comprises an urging portion and a guiding portion which urge against two corresponding mounting portions successively.

15. The cable drag chain assembly of claim 11, wherein a releasing plate extends from each sliding bar, and when the sliding member slides from the second fixing member to the first fixing member, the two releasing plates of the two sliding bars urge up against two corresponding mounting portions.

16. The cable drag chain assembly of claim 11, wherein each releasing plate comprises an urging face at the top and a guiding face extending slantingly and down from a front end of the urging face, and when the sliding member slides from the second fixing member to the first fixing member, the two guiding faces and the two urging faces urge up against the two corresponding mounting portions successively.

17. A cable drag chain for holding a cable, the cable drag chain comprising:
 a first coupling member defining an engaging hole;
 a second coupling member defining a through hole;
 wherein the second coupling member is engaged with the first coupling member for receiving the cable, a front end and a rear end are defined by the first coupling member and the second coupling member;
 a latching member comprising a base, a post extending from the base, and at least one mounting portion, the base is pivotably coupled to a front side of the first coupling member; and
 a sliding member configured to slide along first coupling member and the second coupling member, the sliding member comprises a latching portion;
 wherein, when the sliding member is slid from the front end to the rear end, the latching portion urges against the at least one mounting portion, to make the post of the latching member extend through the through hole and be engaged in the engaging hole of the first coupling member for holding the cable, and when the sliding member is slid from the rear end to the front end, the latching portion of the sliding member urges against the at least one mounting portion of the latching member, to make the post of the latching member be disengaged from the engaging hole of the first coupling member and drop out of the through hole of the second coupling member.

18. The cable drag chain of claim 17, wherein the sliding member further comprises two sliding bars located on the latching portion, two rails are located on each of the first fixing member, the second fixing member, the plurality of first coupling members, and the plurality of the second coupling members, and the two sliding bars are configured to slide along the rails.

19. The cable drag chain of claim 18, wherein the latching portion comprises a top wall, two extending walls located at opposite sides of the top wall, two urging walls located at two bottom sides of the two extending walls, and two coupling walls located at two sides of the two urging walls away from the top wall and coupled to the two sliding bars, and each latching member comprises the two mounting portions located at two sides of the base and configure to be urged against by the two urging walls.

* * * * *